United States Patent [19]

Buchanan

[11] 4,285,373

[45] Aug. 25, 1981

[54] CRUSHING APPARATUS

[76] Inventor: Robert H. Buchanan, 102-2445 Cornwall St., Vancouver B. C., Canada, V6K 1V9

[21] Appl. No.: 84,806

[22] Filed: Oct. 15, 1979

[51] Int. Cl.³ .............................................. B29C 15/00

[52] U.S. Cl. .................................... 144/2 R; 100/153; 144/193 R

[58] Field of Search ................... 144/2 R, 2 Z, 193 R, 144/281 B, 320; 241/200, 223; 100/118, 151, 152, 153, 154

[56] References Cited

U.S. PATENT DOCUMENTS

| | | | |
|---|---|---|---|
| 2,150,984 | 3/1939 | Near et al. | 29/4.5 |
| 3,106,152 | 10/1963 | Coffelt | 100/118 |
| 3,330,206 | 7/1967 | Bechard | 100/153 |
| 3,460,766 | 8/1969 | Sarapuu | 241/200 |
| 3,723,230 | 3/1973 | Troutner | 100/152 |
| 4,004,873 | 1/1977 | De Mets | 100/153 |

*Primary Examiner*—W. D. Bray

*Attorney, Agent, or Firm*—Carver & Co.

[57] ABSTRACT

Crushing apparatus having oppositely disposed endless loops of crushing belts disposed so that inner runs of the belts are spaced closely adjacent to each other to define throat therebetween. Each belt has a slat bed of closely spaced slats connected together and extending transversely thereacross to provide a flat, essentially continuous surface when the slats are coplanar. Belts are powered, and converging intake means admit material to be crushed between the belts. Roller means are journalled on the slats, and rail means extending adjacent and along the two opposed inner runs of the belts cooperate with the roller means to support the inner runs of the belts against crushing forces.

16 Claims, 10 Drawing Figures

FIG 3
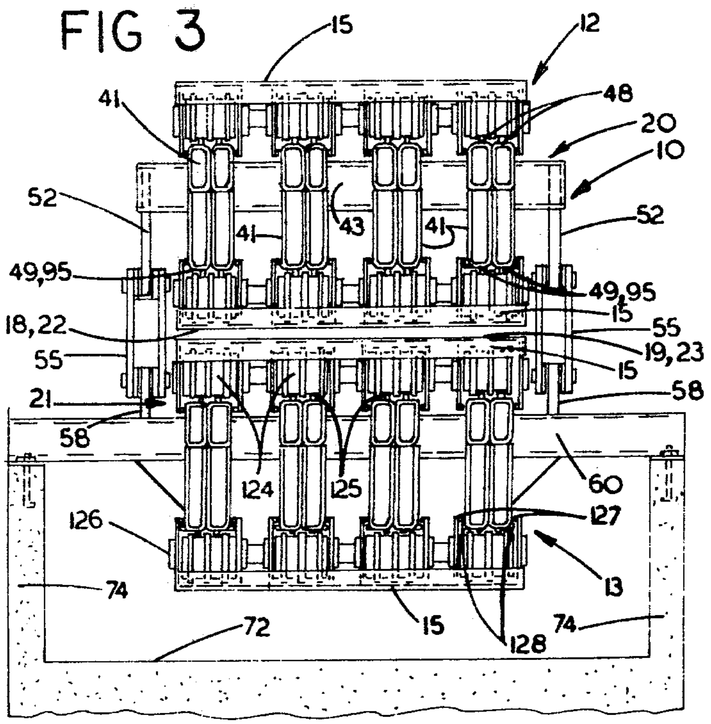
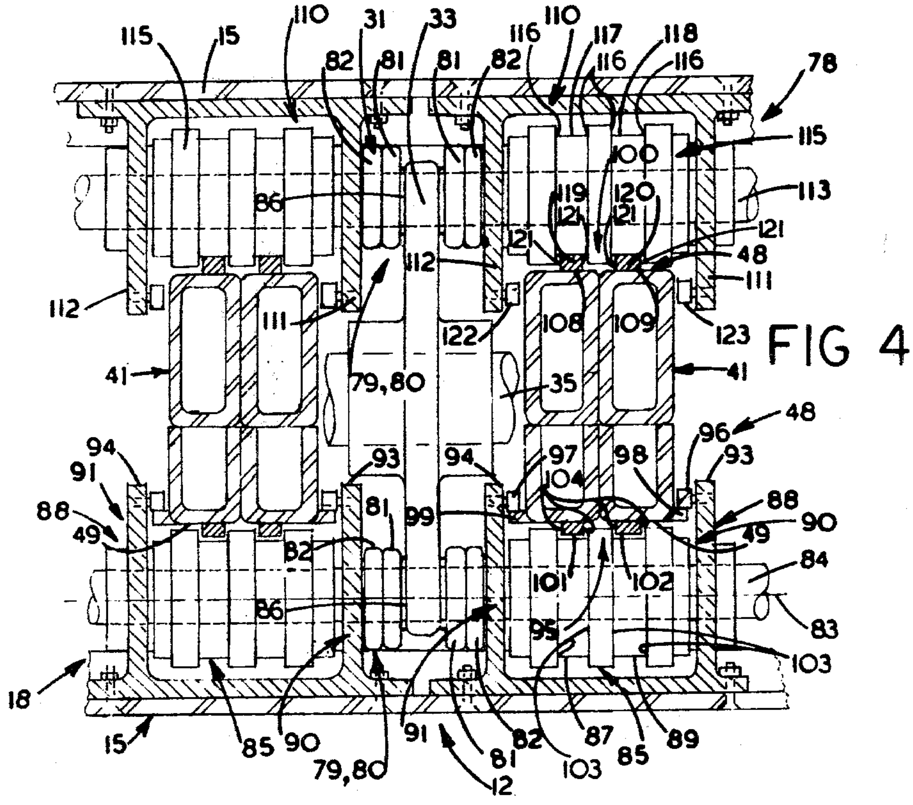
FIG 4

CRUSHING APPARATUS

BACKGROUND OF THE INVENTION

1. Field of the Invention

The invention relates to an apparatus for crushing compressible articles, in particular elongated fiberous articles such as logs.

2. Prior Art

When logs are crushed, their relatively long fibers so obtained can be used in wood products industries, for example in wood pulp and in bonded composite wood panels. Logs that would otherwise be scrapped due to foreign matter embedded therein, for example stones, gravel, etc., can thus be utilized when crushed. Other compressible articles, eg. waste material, can be compacted into billets with uses as land fill, ballast, etc.

It is well known to crush materials using a pair of opposed rollers, or a roller and a flat platten. When final shape of the crushed item is relatively unimportant, such crushing can be appropriate because the crushed item tends to assume a slightly curved shape resulting from the curvature of the crushing roll or rollers. When logs are to be crushed to produce relatively long wood fibers, crushing using one or two rollers breaks the fibers, or at least curves them sufficiently to reduce strength of the wood fibers. This reduction in strength is unacceptable in some applications, particularly for composite bonded wood elements. Furthermore, when items having relatively blunt leading edges are fed into a pair of rollers, opposed cylindrical faces of the rollers form a funnel-shaped "nip" which tends to reject the item being fed into the rollers, unless the rollers are spaced sufficiently widely to accept the item. Commonly, when using rollers, an inwardly directed positive feed force to feed the item forcefully into the nip of the rollers would be needed. A positive feed force usually requires a ram means for feeding material into the rollers but the ram tends to produce a discontinuous feeding process.

Furthermore, the ram is likely to exert a considerable force on the rollers requiring heavy support structure and bearings.

SUMMARY OF THE INVENTION

The present invention reduces some of the difficulties of the prior art by providing a crushing apparatus in which opposed final working surfaces of the crushing apparatus are generally parallel, thus reducing the tendency of the crushed fibers or articles to bend during crushing, or after leaving the apparatus. Furthermore, the apparatus has a relatively shallow inwardly converging infeed portion which reduces loads on the support structure. With normal sized materials, the infeed portion tends to draw material into the apparatus, and thus a ram for feeding the material into the apparatus is not required, thus permitting essentially continuous feeding. Furthermore, infeed structure of the apparatus can be adjusted to accept articles of different sizes.

A crushing apparatus according to the invention has oppositely disposed first and second endless loops of crushing belts carried on respective support means and disposed so that an inner run of the first belt is spaced closely to an adjacent inner run of the second belt to define a throat therebetween. Each belt has a slat bed having a plurality of closely spaced slats extending transversely thereacross to provide an essentially continuous working surface when the slats are coplanar. The apparatus has means to power at least one belt and converging intake means communicating with the throat to admit a forward end of a material to be crushed between the belts. The apparatus is further characterized by each slat having a particular roller means journalled thereon, the roller means being disposed adjacent an inner surface of the slat remote from the working surface and extending substantially along the length of the slat. The roller means thus follows movement of the particular slat and provides support for the slat along the length thereof, each roller means having a longitudinal guiding means. The apparatus also includes rail means carried on the respective support means and extending adjacent and along the two opposed runs of the belts that define the throat. The rail means also cooperates with the longitudinal guiding means of the roller means to restrain the roller means and slats against lateral shifting to ensure essentially longitudinal movement of the crushing belts. Preferably, the longitudinal guiding means of the roller means have guiding shoulders and the rail means have guiding surfaces complementary to the guiding shoulders to cooperate therewith to ensure the said longitudinal movement. The rail means cooperate with the roller means to support against crushing forces, the runs of the belts adjacent to and defining the throat. The rail means extend between outer portions of each respective endless loop of belt and adjacent the inner surfaces of the slats of the inner run. Preferably, to accept articles of different sizes and to vary the amount of crushing, means are provided to vary spacing between the slat beds. p A detailed disclosure following, related to drawings, describes a preferred embodiment of the invention which is capable of expression in structure other than that particularly described and illustrated. The following figures are shown simplified, partially diagrammatic, and usually with portions removed to show internal detail. Much of the supporting structure is omitted for clarity.

DESCRIPTION OF THE DRAWINGS

FIG. 3 is a simplified fragmented section taken generally on line 3—3 of FIG. 1, some portions being omitted, FIG. 4 is a simplified fragmented section taken generally on line 4—4 of FIG. 1, some portions being omitted.

DETAILED DISCLOSURE

Figure 1:
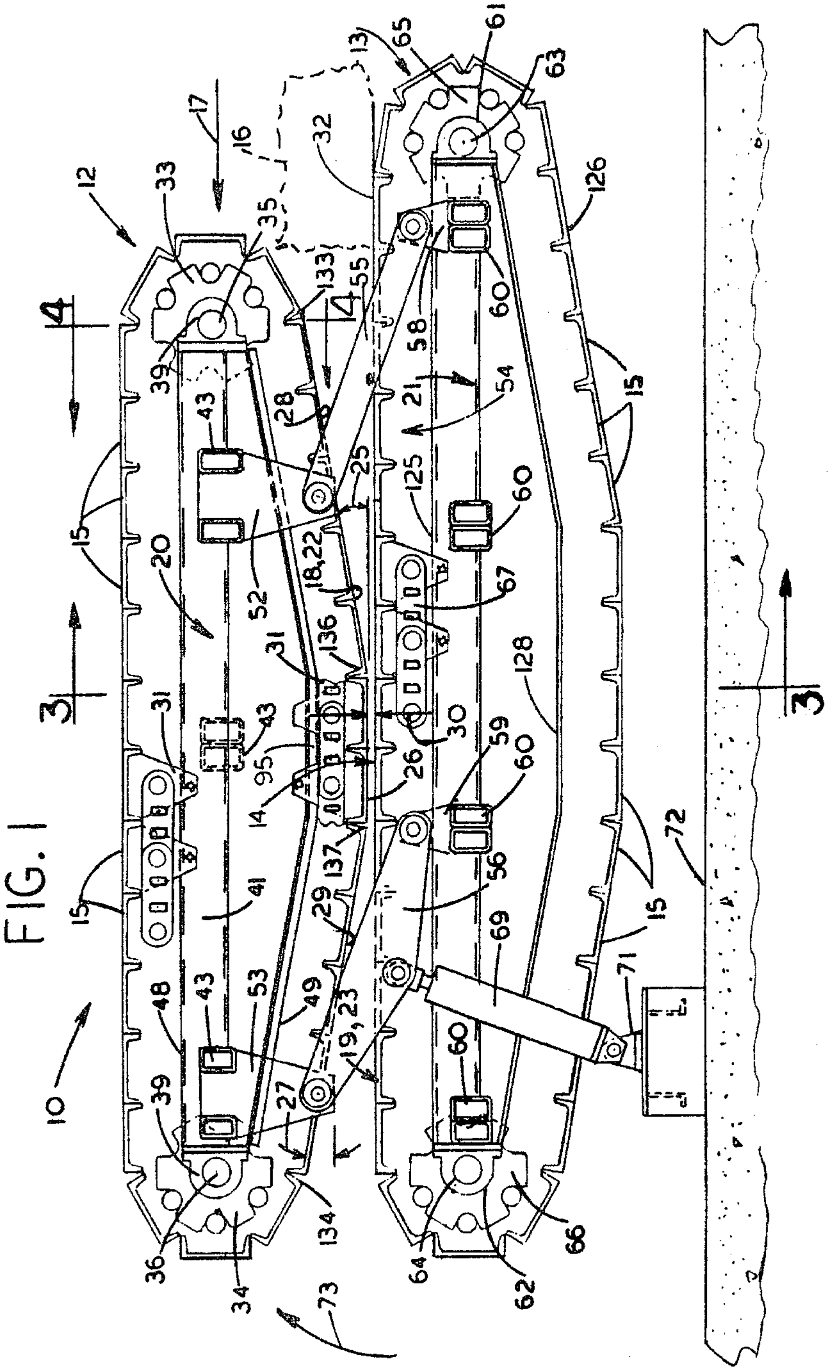
FIG. 1 is a simplified fragmented, partly diagrammatic side elevation of a first embodiment of the crushing apparatus according to the invention.
Figure 2:
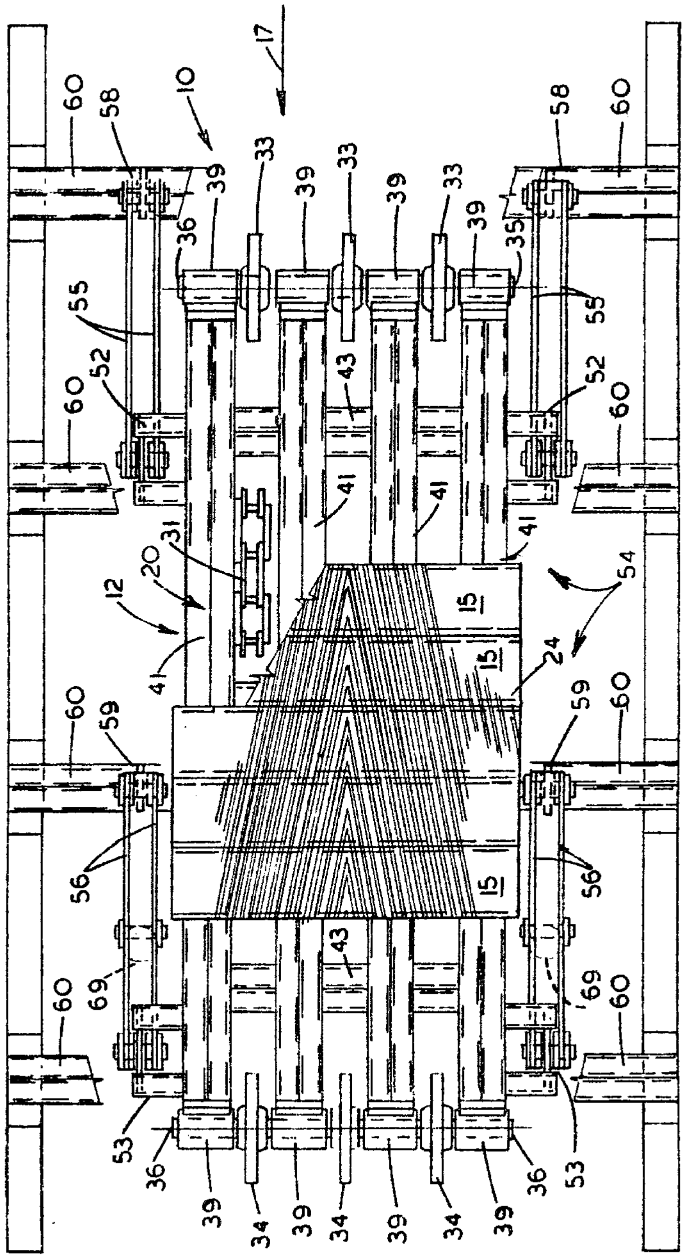
FIG. 2 is a simplified fragmented, partly diagrammatic top plan of the apparatus, a lower portion being omitted.

FIGS. 1 through 3

Referring to FIGS. 1 through 3, a crushing apparatus 10 according to the invention includes oppositely disposed upper and lower endless loops of crushing belts 12 and 13. Each belt has a slat bed having a plurality of transversely extending, closely spaced slats 15 connected together by means to be described. The crusher feeds crushable material, for example a log 16 shown in broken outline in FIG. 1, in direction of an arrow 17, the log being shown supported on the lower belt 13. Other crushable or compressible materials can be fed through the apparatus but the detailed disclosure herein relates to logs.

The upper and lower crushing belts 12 and 13 can be termed first and second belts and are supported on respective support means, ie. upper and lower frames 20 and 21, and thus form two separate but broadly similar cooperating units. A lower or inner run 18 of the upper or first belt 2 and an upper or inner run 19 of the lower or second belt 13 are disposed closely together to define a throat 14 therebetween. The lower run 18 is generally adjacent and above the upper run 19 to provide oppositely disposed upper and lower working sections 22 and 23 of the belts 12 and 13 respectively. The lower working section 23 has a generally flat and level upper surface to accept and support the log. The upper section 22 has, at the throat 14, a mid portion 26 which is generally parallel to the lower section 23 and spaced therefrom by a spacing 30. The portion 26 is straddled by inclined, generally flat infeed and outfeed portions 28 and 29 which extend upwardly and outwardly from the mid portion 26 at angles 25 and 27 respectively, each angle being about 30 degrees. Thus a log entering an intake portion of the apparatus is subjected to a gradually increasing compression force until a maximum force is attained at the throat 14, after which the compression reduces. It can be seen that when sections of the belts are aligned the slats are coplanar and provide an essentially continuous flat working surface.

Referring to FIG. 1 only, it can be seen that the lower belt 13 extends forwardly relative to the upper belt 12 to provide an intake support means 32 for carrying logs into the throat. The angle 25 of the infeed portion 28 facilitates admittance of the forward end of the log and serves as converging intake means communicating with the throat. Serrations 24 on outer working faces of the slat beds, seen only in FIG. 2, augment gripping of the logs to feed them through the crusher. Feeder mechanism, not shown, may be used to initiate feeding of the log into the infeed portion 28 although, with suitable selection of the angle 25 and spacing between the beds relative to log size, such a feeder mechanism can be eliminated. The outwardly inclined outfeed section 29 may be necessary if the device has to be reversed to feed logs backwards through the crusher to help release a jam or other malfunction.

The upper belt 12 includes a plurality of similar, laterally spaced, upper drive chains severally 31 which are connected together and cooperate with the plurality of slats 15. The chains 31 are roller chain type and extend around a plurality of respective infeed or head sprockets 33, and around outfeed or tail sprockets 34, the sprockets being mounted on head and tail sprocket shafts 35 and 36 respectively. The shafts 35 and 36 are journalled in journals severally 39 which are secured to opposite ends of the upper frame 20. Preferably the tail shaft 36 is powered to drive the belt 12, but other means to power the belt can be devised. The frame 20 has a plurality of parallel main longitudinal frame members 41 which are connected together by a plurality of parallel transverse frame members 43 disposed normally to the members 41 to form a rigid open framework. The main longitudinal members 41 are relatively deep members to support reactions to crushing loads and have upper and lower rail means 48 and 49 adapted to support the upper and lower runs of the belt 12, as will be described in greater detail with reference to FIGS. 4 through 6. The frame 20 serves two main purposes, namely to provide journals for journalling the sprocket shafts, and to provide support for the belt 12, particularly the lower run 18 thereof, as will be described.

Head and tail upper support bracket pairs 52 and 53 are generally similar and extend downwardly from end of transverse members 43 adjacent the inlet and outlet ends of the main longitudinal frames 41. As best seen in FIG. 1, head and tail connecting link pairs 55 and 56 respectively are hinged at upper ends thereof to the bracket pairs 52 and 53, and at lower ends thereof to similarly spaced head and tail lower support bracket pairs 58 and 59 respectively. The brackets 58 and 59 are carried on transverse frame members 60 of the lower frame 21, and the link pairs 55 and 56 have approximately equal lengths so as to form a four-bar parallelogram mechanism 54 in which the two belts 12 and 13 with respective frames 20 and 21 and the link pairs constitute opposite sides of the parallelogram. The frame 21 has head and tail shaft journals 61 and 62 journalling lower head and tail shafts 63 and 64 respectively, which shafts carry several head and tail sprockets 65 and 66 respectively. A plurality of similar lower drive chains 67 carry the crushing belt 13 and run on the sprockets 65 and 66 in a manner similar to the drive chains 31 of the belt 12. Preferably, the tail shaft 64 is powered to drive the lower slat bed, but alternate means can be used.

It can be seen that the parallelogram mechanism 54 formed by the upper and lower frames 20 and 21 hinged by the connecting link pairs 55 and 56 permits the belts to move relative to each other. As best seen in FIG. 1, jacking cylinder pairs 69 extend between the tail connecting link pair 56 and respective foundation anchors 71 carried on a foundation bed 72 so that extension of the cylinder pairs rotates the links 55 and 56 in direction of an arrow 73, thus increasing spacing between the crushing belts so as to increase size of material to be accepted in the crusher. As seen only in FIG. 3, the transverse members 60 are carried on foundation walls 74 to support weight of the upper frame and the belt 12, the jacking cylinder pairs 69 carrying the balance of the weight. Thus the parallelogram mechanism 54 extends between the support means 20 and 21 of the belts 12 and 13 so that actuation of the parallelogram mechanism moves one support means generally relative to the other support means to vary throat size. The mechanism 54 is thus spacing adjustment means cooperating with the crushing belt for moving at least one of the belts so as to vary spacing therebetween.

Figure 5:
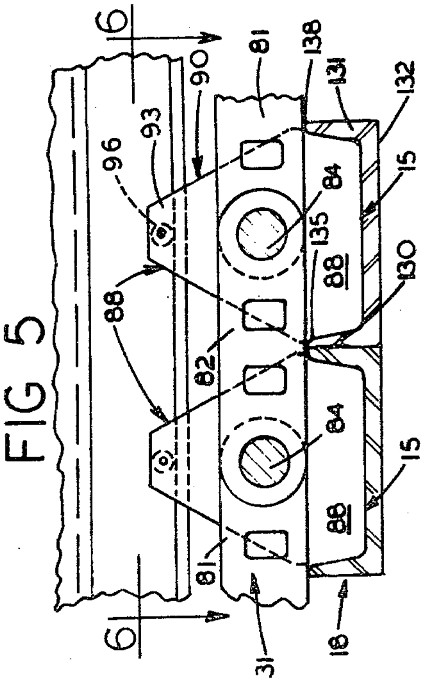
FIG. 5 is a simplified longitudinal section of a lower portion of an upper track showing two adjacent roller chain links and slats, as seen from line 5—5 of FIG. 6.
Figure 6:
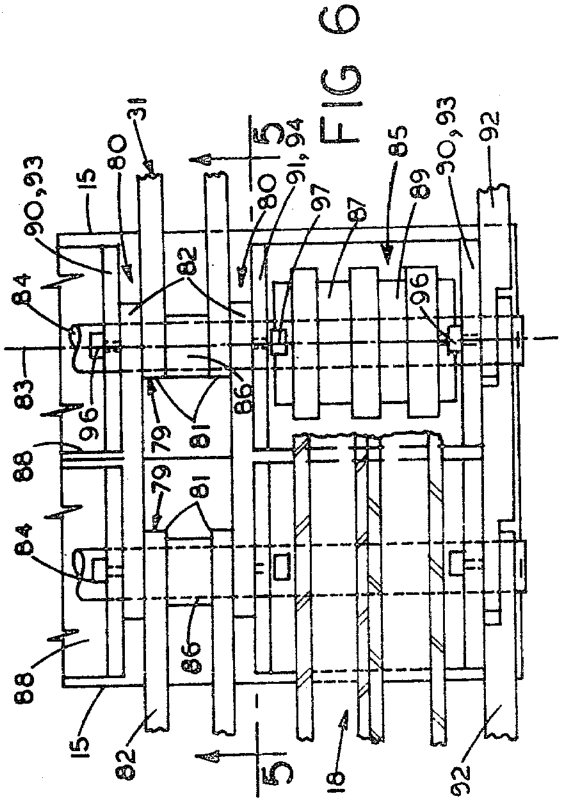
FIG. 6 is a simplified fragmented top section of a portion of the track and chain, as seen generally from line 6—6 of FIG. 5.

FIGS. 4 through 6

With reference to FIGS. 4 through 6, on a portion of the head shaft 35, one of the upper head sprockets 33 is straddled by a pair of adjacent longitudinal frame members 41 carrying respective journals 39 (not shown in FIG. 4) to journal the shaft 35. The description following relates to the lower run 18 of the belt 12, and, although an upper run 78 of the belt 12 is identical structurally, the upper run cooperates in a different manner with the frame 20. The drive chain 31 has a plurality of two types of links, namely inner links 79 and outer links 80. The inner link 79 has a pair of spaced inner side bars 81 and the outer link 80 has a pair of spaced outer side bars 82, ends of the side bars being journalled on common chain pins 84 passing therethrough. The inner links have chain spacer rollers 86 journalled on the pin 84 to space the inner side bar apart and serve as rollers to bear loads from the sprockets on the chain.

In FIG. 5, two adjacent slats 15 are shown, each slat 15 having several spaced apart U-shaped chairs 88 bolted thereto. Each chair has a pair of spaced parallel transverse flanges 90 and 91 extending inwardly from the slat and having a pair of undesignated openings therein to journal the chair on the respective pin 84. On a particular pin 84 the spacer roller 86 is straddled by the outer side bars 82, which are in turn straddled by the transverse flanges 90 and 91 of two adjacent chairs 88. Overlapping links 92 extend along an edge of the belt to tie ends of the slats together.

A grooved primary roller 85 is also journalled on the pin 84 for rotation about a primary roller axis 83 between the flanges 90 and 91 of each chair 88. The roller 85 has a pair of spaced grooves 87 and 89 in the periphery thereof, each groove providing a pair of generally parallel annular faces, each face providing a guiding shoulder 103. As seen in FIG. 4, the upper rail means 48 has a lower primary track 95 which is aligned vertically with and adjacent the primary roller 85 to cooperate with the primary roller to react against crushing forces on the lower run of the belt. The means 48 also has an upper primary track 100 to carry weight of the upper run of the belt. The lower track 95 has a pair of parallel guides 101 and 102 which extend downwardly therefrom and are received in complementary grooves 87 and 89 of the grooved roller 85. The guides have guiding surfaces 104 which are complementary to and engage the guiding shoulder 103 of the rollers. When there is an upwards force in the lower run 18 from the crushing reaction, the rollers 85 are positively engaged by the guides 101 and 102. Thus the guiding surfaces cooperate with the guiding shoulders to maintain alignment of the roller 85 as it rolls along the primary track.

Thus the guiding shoulders serve as longitudinal guiding means for each roller or roller means. The rail means cooperate with the longitudinal guiding means of the roller means to restrain the roller means and slats against lateral shifting to ensure essentially longitudinal movement of the crushing belts. Lateral restraint of the belts is important because the belts will be subjected to random forces in many directions within the plane of the working surface due to variations in local strengths of the log, eg, due to knots, cracks, rottenness, etc. The guiding shoulders can be seen to be generally within a plane disposed normally to an axis of rotation, not shown, of the roller. Also, the rail guiding surfaces are disposed generally within a plane normal to the axis of rotation of the roller so as to cooperate with the guiding shoulder to maintain alignment of each roller as it rolls along the primary track to reduce lateral shifting of the crushing belt so as to maintain longitudinal movement of the crushing belts.

The flanges 90 and 91 have upper portions 93 and 94 carrying a pair of undesignated secondary pins which journal inwardly disposed secondary rollers 96 and 97 for rotation about undesignated secondary roller axes disposed parallel to the primary roller axis 83. The secondary rollers 96 and 97 are portions of the roller means and engage respective secondary tracks 98 and 99 which extend outwardly from lower portions of the frame member 41. When there is no upward force acting on the lower run 18 of the bed 12, ie. as a reaction to the crushing force, the chairs of the lower run of the belt 12 are supported by the rollers 96 and 97 engaging and running on the tracks 98 and 99 on opposite sides of the frame member 41. Without an upwards force on the run 18, the grooves 87 and 89 of the roller 85 and the guides 101 and 102 of the primary track also assist in maintaining alignment of the lower run 18 of the slat bed, side faces of the grooves interfering with the guides to resist lateral forces acting on the slats 15.

Thus, in summary, it can be seen that the roller means of the slats, ie. the primary and secondary rollers, are disposed inwardly of the endless loop of crushing belts, ie. the rail means extend adjacent the inner surfaces of the slats. Also the respective rail means, ie. the primary and secondary tracks, cooperating with the roller means extend generally between outer portions of each endless loop of belt.

Each slat has a chair on each side of each drive chain and thus, as there are three drive chains in each belt, each slat has four chairs spaced therealong, with each chair having a pair of flanges which straddle the respective grooved primary roller 85 and the adjacent main longitudinal frame member 41. Also a plurality of parallel chain pins 84 extend transversely across the slat bed of each crushing belt, the pins cooperating with both the drive chains and the roller means for journalling the chains and the roller means respectively relative to the slats, and coupling a respective slat to an adjacent portion of the endless drive chain. Thus each slat has a particular roller means journalled thereon, the roller means being disposed adjacent an inner surface of the slat remote from the working surface and extending substantially along the length of the slat to follow the movement of the particular slat and to provide support for the slat along the length thereof.

Referring only to FIG. 4, the upper or return run 78 of the belt 12 extends along and is supported on the upper rail means 48 of the member 41 using the grooved rollers and guides in a similar manner as follows. As previously stated, the structure of the upper run 78 is identical to that of the lower run 18 but is annotated differently for ease of description. A particular slat 15 of the run 78 has a plurality of U-shaped chairs 110 having flanges 111 and 112 journalled on a chain pin 113 which extends through the chairs 110 and the chain 31. Grooved primary rollers 116, journalled on the pin 113, are straddled by the flanges 111 and 112 and have grooves 117 and 118 which engage guides 119 and 120 extending along the rail means 48. The grooves 117 and 118 provide guiding shoulder 116 equivalent to the shoulder 103, and the guides 119 and 120 provide guiding surfaces 121 equivalent to the guiding surfaces 104. The flanges carry journalled secondary rollers 122 and 123 equivalent to the rollers 96 and 97. Weight of the upper run 78 is carried by the grooved primary rollers 115 running on the guides 119 and 120, and the secondary rollers 122 and 123 hang freely and carry no weight of the upper run and function only on the lower run as aforesaid. Thus the upper or return run 78 of the upper belt uses primary rollers and tracks similar to the lower run as both primary tracks are subjected to inwardly directed forces.

Thus when a particular portion of the belt 12 is in the upper run 78, the grooved rollers roll along the upper primary track 100 and are guided by the guides 119 and 120. After passing around the tail sprocket 34, the belt is supported by one of two structures as follows. When the apparatus is empty or there is no upward force on the lower run 18, the lower run 18 of the belt hangs from secondary rollers 96 and 97 engaging the secondary track 98 and 99. When a log is passing through the crusher, reaction to crushing forces on the log pushes the slats 15 of the lower run generally upwards and unloads the rollers 96 and 97. Thus, the upwards force on the lower run 18 generated by reaction to the crushing force is borne by the grooved rollers 85 rolling on the guides 101 and 102. This is similar to the grooved rollers 115 of the upper run running on the guides 119 and 120 and thus provide rolling contact against the crushing forces. The crushing force reactions on the grooved rollers and guides 101 and 102 are expected to be considerable and thus the grooved rollers and associated guides are relatively heavy duty members. Loads on the secondary rollers and the secondary tracks are expected to be relatively light as these members carry merely the deadweight of the chain and crushing belt.

FIGS. 1, 3 and 5

Referring again to FIGS. 1 and 3, the lower crushing belt and associated frame of the apparatus are generally similar to the upper crushing belt and frame, with exception as follows. The upper run 19 of the belt 13 runs at the lower working section 23 and carries not only deadweight of the upper run of the chain and the log, but also crushing forces from the reaction to the log being crushed. Thus primary rollers 124 are carried on a primary track 125 adjacent the working section and are generally similar to the corresponding track and rollers of the upper belt with additional reinforcing to the track and frame, etc. where necessary to support the additional loads. A lower run 126 of the chain 67 is similarly supported by secondary rollers 127 extending from the chairs and running on respective secondary tracks 128. The rollers 127 and the tracks 128 are generally similar to corresponding tracks of the upper belt except that in the lower run 126 the rollers and track sustain only deadweight and lateral tension of the chain.

Thus, summarizing the support structure of the upper and lower belts, the primary track 95 of the upper belt 12 is adjacent the lower run 18 and withstands at least the upwards reaction forces from material being crushed between the belts. The primary track 125 of the lower belt is adjacent the upper run 19 and withstands crushing forces, tension forces of the belt and weight of the belt and material carried thereon. The secondary tracks 98 and 99 of the upper belt 12 are also adjacent the lower run 18 and carries weight of upper belt and tension forces therein. The secondary track 128 of the lower belt 13 is adjacent the lower run 126 and carries weight of the belt and tension forces therein. Clearly with the upper runs of belts, the primary rollers and tracks sustain loads due to weight of the belt, plus crushing forces and log weight where appropriate. With lower runs of belts, the secondary rollers and tracks sustain weight of the belts, except for the lower run 18 of the belt 12 which also has primary rollers running on primary tracks to react against crushing forces.

As best seen in FIG. 5, one particular slat 15 of the belt 12 has a pair of spaced parallel longitudinal flanges 130 and 131 which extend longitudinally along longer sides of, and between ends of, the slats and provide sufficient rigidity for the slats to essentially resist bending forces due to crushing of logs. The flanges extend inwardly towards and contact the adjacent drive chain and have outer surfaces at right angles to a working outer surface 132 of the slat 15. The flanges cooperate with adjacent similar flanges of adjacent slats to form an essentially continuous working surface free of large gaps as it passes through the throat of the crushing apparatus. It can be appreciated that as the belt 12 passes from and onto the sprockets adjacent the infeed and outfeed portions respectively, and from the infeed portion to the throat portion and then through to the outfeed portions, as seen in FIG. 1, gaps 133, 134, 136 and 137 open up between outer faces of the flanges, ie. along the sides of the slat. As the change between the portions 26, 28 and 29 and from the sprockets is relatively gradual, the gaps are sufficiently narrow to reduce serious inclusion of material between the flanges which might prevent them from closing when the chain re-enters straight portions. Inner edges 135 and 138 of the flanges 130 and 131 contact adjacent edges of the links 81 and 82 of the drive chain 31 and thus provide means to reduce rocking of the slats that might otherwise occur, this maintaining an essentially flat surface when the slats are coplanar.

Figure 7:
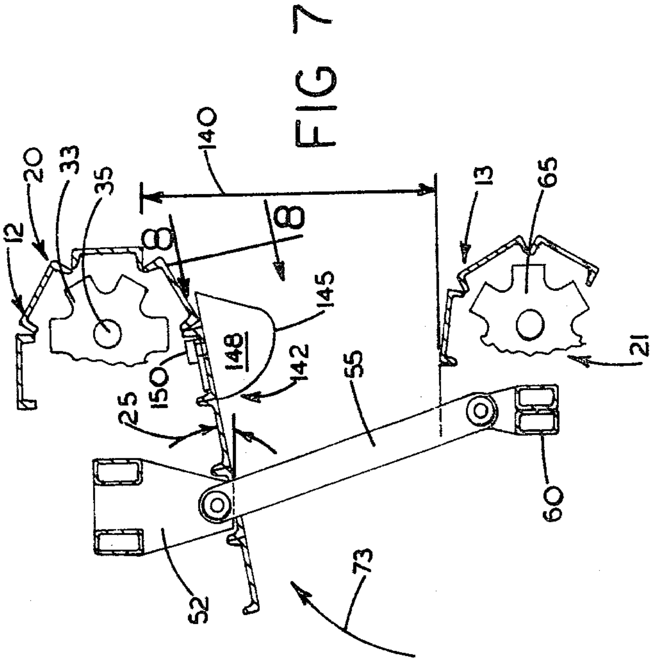
FIG. 7 is a simplified fragmented side elevation of an infeed portion of the apparatus showing maximum size of intake of the appartus to accept articles having maximum depth.
Figure 8:
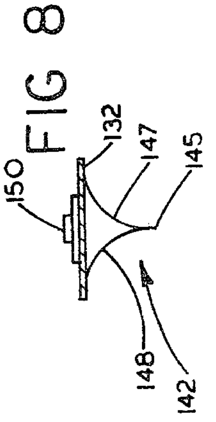
FIG. 8 is a simplified fragmented section on line 8—8 of FIG. 7.

FIGS. 1, 7 and 8

Referring to FIGS. 1 and 7, when the cylinder pair 69 is actuated, the link pairs 55 and 56 both swing upwards and forwards in direction of the arrow 73. One link 55 only is shown in FIG. 7, and it can be seen that the head sprocket 33 of the upper belt 12, and the head sprocket 65 of the lower belt 13 move away from each other, thus increasing spacing between the belts at the intake to a maximum spacing 140 measured as shown in FIG. 7. The spacing 140 is considered maximum and is used when the machine is opened to receive material on the lower belt 13 having maximum depth. Due to the parallelogram linkage formed by the link pairs 55 and 56, and the upper and lower frames 20 and 21, the angles 25 and 27 of the portions 28 and 29, and inclination of the portion 26 of the lower run 18 remain unchanged.

In some applications, particularly when articles to be crushed are approaching maximum size or the material is exceptionally resistant to crushing, it can be advantageous to provide splitter wedges mounted on some slats. Referring to FIGS. 7 and 8, a typical splitter wedge 142 is mounted on the slat 15, and has an axial splitting edge 145 and two converging concave side faces 147 and 148 which intersect along the edge 145. The wedge is releasably connected to the outer working surface 132 of the slat 15 by bolt means 150, or other releasable fastening means can be devised. Preferably the splitter wedge is used only to initiate splitting of the log to serve as a primary breakdown of the log prior to entry of the split log into the throat of the crusher. It is anticipated that the splitter wedges would be fitted on the upper belt only when the upper and lower belts are spaced sufficiently to accept the wedges through the throat, which would be correspondingly wider and thus provide sufficient clearance for the wedge. Alternatively, if the wedges are to be used when the crusher has insufficient clearance for the wedge in the throat section, clearance, not shown, can be provided in the appropriate slats of the lower belt to accept the wedges. Equivalent means cooperating with the splitter wedges could be used to prevent interference of the wedges with the remaining belt.

OPERATION

In operation, preferably both the crushing belts are driven to facilitate drawing the logs into the crusher. The tail shafts 64 and 36 are driven to move the lower and upper runs 18 and 19 in tension so that the front end of the log 16 is carried into the crusher, the log being progressively split and broken laterally as it is drawn towards the throat. The serrations 24 tend to engage the log and reduce a tendency of the log to slip backwards on the crushing belt. As the log is drawn through the throat it is reduced to longitudinally extending slivers, strips, etc. having a thickness no greater than the minimum spacing 30 at the throat. The strips, etc. tend to have relatively long fibers, depending upon knot density of the particular log. The logs tend to fracture at annular rings and thus the log is reduced by peeling and breaking.

If the log has a relatively large diameter the cylinders 69 are extended, thus actuating the parallelogram mechanism 54 to increase the spacing 140 at the intake as shown in FIG. 7. For the larger diameter logs the splitter wedges 142 can be fitted to assist in primary breakdown of the lumber.

ALTERNATIVES AND EQUIVALENTS

The particular belts as described show drive chains having the chain pins 84 extending across the full width of the belt with the drive sprockets driving the chains by acting directly on the spacer rollers 86. Many alternative drive chains and crushing belts can be devised, for example the chain pins can be shorter so as to extend between flanges of the chairs, with the grooved rollers journalled on the pins and being engaged by the sprocket teeth, thus eliminating the spacer rollers, etc. In such instances, each slat would have at least one pair of spaced transverse flanges having aligned openings therein to receive the respective chain pins.

The belts 12 and 13 of the crusher 10 are shown with three drive chains and four sets of primary and secondary rollers and respective tracks. Clearly if the apparatus is to be limited to relatively small logs, width of the crusher could be reduced so that fewer drive chains, roller and tracks would be required. Preferably two drive chains per belt would be the normal minimum, but in some instances, one drive chain per belt might suffice. With some designs, the drive chain as such might be eliminated completely so that the drive means is combined directly with the slat which thus has integral means for being driven. If the drive chain is eliminated, alternative means to reduce rocking of the slats should be incorporated.

Similarly, the number of roller means and corresponding rail means can be reduced, but in any event the roller means are journalled on the slats and the rail means are carried on the respective support means and extend along the two opposed runs of belts that define the throat. Also, the rail means cooperate with the roller means to support against crushing forces the inner runs of the belt adjacent to and defining the throat.

Also, as shown the feed direction of material through the device is horizontal and thus the first and second belts are upper and lower belts respectively with lower and upper runs respectively, ie. inner runs thereof, defining the throat. Clearly, the feed direction could be changed to be inclined, or even vertical and alternate roller and rail means for returning runs of the belts could be devised.

Figures 9, 10:
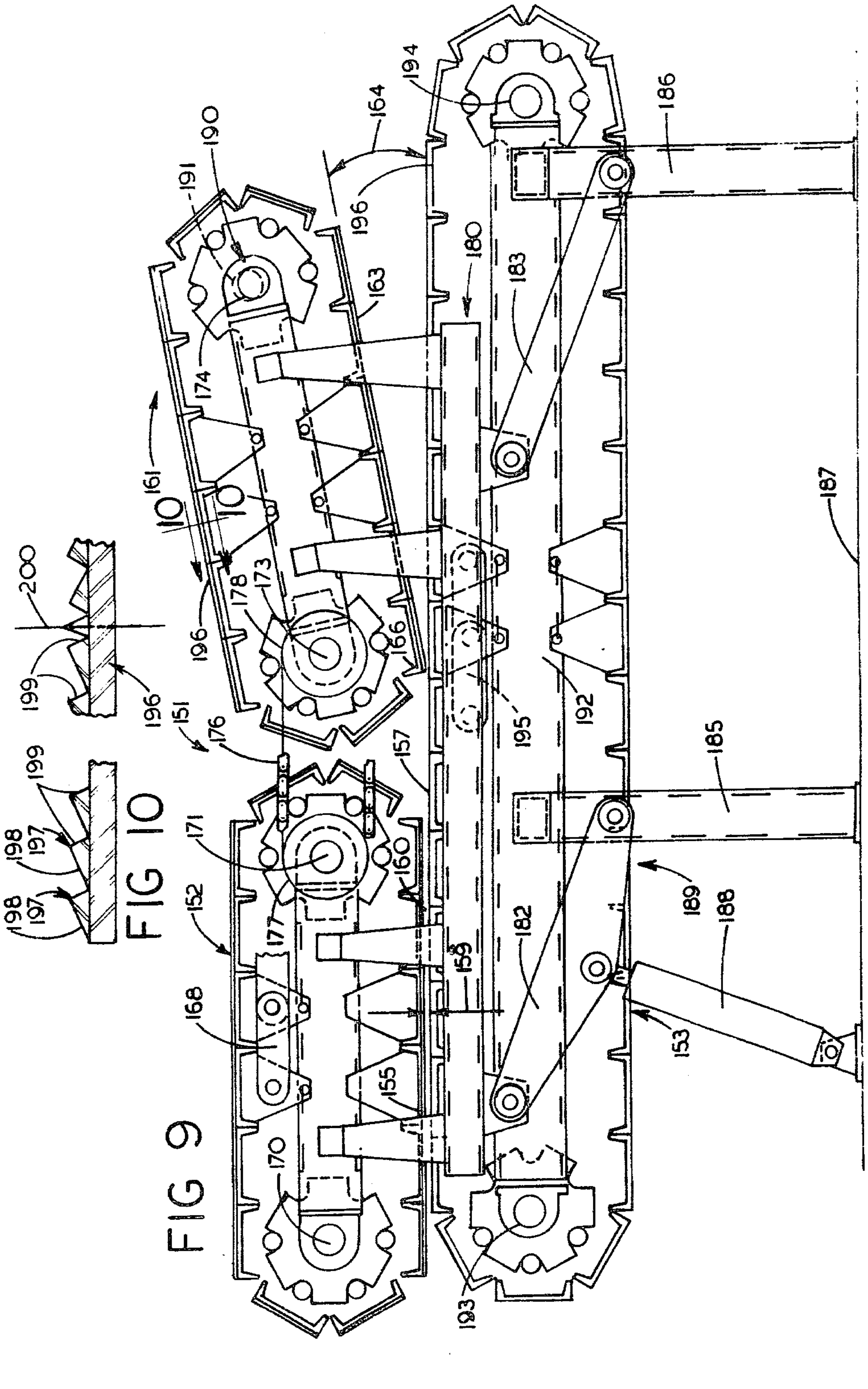
FIG. 9 is a simplified, partly diagrammatic side elevation of an alternative crushing apparatus.
FIG. 10 is a section through a slat of the apparatus as seen generally from line 10—10 of FIG. 9.

FIGS. 9 and 10

An alternative log crusher 151 has endless loops of first and second crushing belts 152 and 153 which are generally similar to the belts 12 and 13 of FIG. 1. The belt 152 has a lower or inner run 155 spaced closely from and parallel to an upper or inner run 157 of the second belt by a spacing 159 to define a throat 160 therebetween. The apparatus includes a similar third loop of crushing belt 161 disposed upstream of the first belt 152 and having an inner run 163 inclined at an angle 164 to the inner run 155 of the first belt. The third belt is positioned so that a downstream portion 166 thereof is spaced from the inner run 157 of the second belt approximately at the same distance as the inner run of the first belt, that is by the spacing 159 of the throat 160.

The first and third belts 152 and 161 are carried on drive chains, a portion 168 of which is shown for the first belt only, the drive chains passing around undesignated sprockets carried on shafts 170 and 171 of the first belt, and similar shafts 173 and 174 for the third belt. A connecting chain 176 extends between additional sprockets 177 and 178 carried on the adjacent shafts 171 and 173 respectively so as to connect the first and third belts together for concurrent rotation in the same direction. An upper support frame 180 supports the shafts 170, 171, 173 and 174 which in turn carry the first and third belts and associated structure. Parallel connecting link pairs 182 and 183 have upper ends journalled on the upper frame 180, and lower ends journalled on vertical posts 185 and 186 extending from foundations 187. A jacking cylinder 188 extends from the foundations and is connected to the link pair 182 to provide an extensible parallelogram mechanism 190 which is equivalent to the parallelogram mechanism 54 of FIG. 1. The second belt is carried on a frame 192 supported on the posts 185 and 186, which frame journals sprockets on shafts 193 and 194 carrying a drive chain 195, which in turn connects together and drives the second belt 153. Vibrator means 190 cooperate with the shaft 196 to vibrate the forward portion of the belt 161. The vibration so produced facilitates crushing of the log, and can be attained by eccentrics 191 on the shaft 174 to mount the sprockets for vibrating motion. The crushing belts, support frame, sprockets and drive chains, rollers and tracks, etc. of the log crusher 151 are generally similar to those of the crusher 10 of FIG. 1. It can be seen that the third crushing belt 161 provides additional clearance for accepting larger logs, whilst at the same time providing an extended intake for receiving large logs. Also, it can be seen that the inner run of the second belt extends upstream from the first belt to be spaced from the inner run of the third belt to define the converging intake means therewith.

Referring to FIG. 10, the crushing belts 152, 153 and 161 function similarly to previously described belts, but the belt 161 has a plurality of alternate slats 196, a section of which only is shown in FIG. 10. The slats have a series of assymmetrically V-shaped ridges 197 extending transversely thereacross, that is in the direction of the feed of the belt. The ridges 197 have shallowly sloping outer faces 198 and more steeply sloping inner faces 199. The ridges 197 are disposed generally symmetrically about a central plane 200 of the slat, and serve as axial guide means disposed in direction of feed of the belt and extending across outer faces thereof to restrain lateral movement of material carried on the belt. Clearly, similar means could be also provided on the slat 15 of the crusher 10 with or without the serration 24 shown on the slats 15. The crushing belts of either apparatus could include the slats 15 which could alternate with the slats 196 so as to provide axial guide means to restrain lateral movement of material, with the serrations 24 to assist in drawing material into the apparatus. The ridges 197 of the third belt 161 would be longer, eg. 3 to 6 cms deep, than those that might be used on the first and second belts, which might be between 0.5 and 2 cms deep.

I claim:

1. A crushing apparatus having: oppositely disposed first and second endless loops of crushing belts carried on respective support means and disposed so that an inner run of the first belt is spaced closely to an adjacent inner run of the second belt to define a throat therebetween, wherein each belt has a slat bed having a plurality of closely spaced slats connected together and extending transversely thereacross to provide an essentially continuous working surface when the slats are coplanar, the apparatus also including means to power at least one belt and converging intake means communicating with the throat to admit a forward end of material to be crushed between the belts, the apparatus being further characterized by:

(a) each slat having particular roller means journalled thereon, the roller means being disposed adjacent an inner surface of the slat remote from the working surface and extending substantially along the length of the slat to follow movement of the particular slat and to support the slat along the length thereof, each roller means having means associated theewith defining a longitudinal guiding means, (b) rail means carried on the respective support means and extending adjacent and along the two opposed inner runs of the belts that define the throat, the rail means extending between outer portions of each respective endless loop of belt and adjacent the inner surfaces of the slats of the inner runs, the rail means cooperating with the roller means to support against crushing forces the runs of the belts adjacent to and defining the throat and also cooperating with the longitudinal guiding means of the roller means to restrain the roller means and slats against lateral shifting to ensure essentially longitudinal movement of the crushing belts.

2. A crushing apparatus as claimed in claim 1 in which the first and second belts are upper and lower belts respectively, each belt having respective upper and lower runs, a lower run of the upper belt being closely adjacent an upper run of the lower belt to define the throat therebetween, and the rail means is further characterized by:

(a) primary and secondary tracks, the primary track of the upper belt being adjacent the lower run of the belt and being adapted to withstand at least upwards reaction forces from material being crushed between the belts, the primary track of the lower belt being adjacent the upper run of the belt and being adapted to withstand the reaction forces from material being crushed plus weight of the belt and material carried thereon; the secondary track of the upper belt being also adjacent the lower run and being adapted to carry weight of the upper belt, the secondary track of the lower belt being adjacent the lower run of the belt and being adapted to carry the weight of the belt.

3. A crushing apparatus as claimed in claim 1 characterized by:

(a) at least one endless drive chain hinged to the slats to connect the slats together, (b) a plurality of parallel chain pins extending transversely across the slat bed of each crushing belt, the pins cooperating with both the drive chain and the roller means for journalling the chain and the roller means respectively relative to the slats, and the apparatus further includes:

(c) spaced forward and aft sprockets carrying the drive chain thereon.

4. A crushing apparatus as claimed in claim 3 further characterized by:

(a) each slat cooperating with at least one pair of spaced transverse flanges having aligned openings therein to receive the respective chain pins, (b) the roller means of each slat having at least one primary roller carried on the shaft between the flanges for rotation about a primary roller axis, (c) the rail means having a primary track aligned with and adjacent the primary rollers to cooperate with the primary roller to react against crushing forces.

5. A crushing apparatus as claimed in claim 4 further characterized by:

(a) the longitudinal guiding means of each roller having comprising at least one annular face defining a guiding shoulder generally within a plane disposed normally to the axis of rotation of the roller, (b) the primary track of each rail means adjacent the inner runs of the belt defining the throat having at least one longitudinal guiding surface generally complementary to the guiding shoulder, the guiding surface being disposed generally within a plane normal to the axis of rotation of the roller so as to cooperate with the guiding shoulder to maintain alignment of each roller as it rolls along the primary track to reduce lateral shifting of the crushing belts.

6. A crushing apparatus as claimed in claim 4 further characterized by:

(a) the roller means of each slat having at least one secondary roller, the secondary roller being journalled for rotation about a secondary roller axis disposed parallel to the primary roller axis, (b) the rail means including at least one secondary track to engage the respective secondary roller for a lower run of the belt, the secondary rollers running on the secondary tracks to carry weight of the lower run of the belt.

7. A crushing apparatus as claimed in claim 1 in which the belts are further characterized by:

(a) at least two endless drive chains hinged to the slats to connect the slats together, (b) a plurality of parallel chain pins extending transversely across the slat bed of each crushing belt, each chain pin coupling a respective slat to an adjacent portion of the endless drive chains, (c) each drive chain having links having pairs of spaced inner and outer side bars and chain spacers, the inner side bars being spaced apart by the respective chain spacers, and the apparatus further includes:

(d) spaced sprockets carrying the drive chains to engage the chain spacers between the spaced inner side bars, at least one of the sprockets being powered.

8. A crushing apparatus as claimed in claim 1 further characterized by:

(a) spacing adjustment means cooperating with the first and second endless crushing belts for moving at least one of the belts laterally so as to vary spacing between opposed rums of the belts to vary throat size.

9. A crushing apparatus as claimed in claim 8 in which the spacing adjustment means to vary spacing between the crushing belts is further characterized by:

(a) a parallelogram mechansim extending between the support means of the upper and lower belts, so that actuation of the parallelogram mechanism moves one support means generally laterally relative to the other support means to vary throat size.

10. A crushing apparatus as claimed in claim 1 further characterized by:

(a) at least one crushing belt having splitter means thereon, (b) means cooperating with the splitter means to prevent interference with the remaining crushing belt in the throat.

11. A crushing apparatus as claimed in claim 1 further characterized by:

(a) a third loop of crushing belt disposed upstream of the first belt and having an inner run inclined at an angle to the inner run of the first belt and positioned so that a downstream portion of the inner run of the third belt is spaced from the inner run of the second belt approximately at the same distance as the inner run of the first belt, (b) the inner run of the second belt extends upstream from the first belt to be spaced from the inner run of the third belt to define the converging intake means therewith.

12. A crushing apparatus as claimed in claim 1 further characterized by:

(a) the slats having axial guide means disposed in the direction of feed of the belt and extending across outer faces thereof to restrain lateral movement of material carried on the belt.

13. A crushing apparatus as claimed in claim 1 further characterized by:

(a) means on the slats to reduce rocking of the slats, so as to maintain an essentially flat surface when the slats are coplanar.

14. A crushing apparatus as claimed in claim 1 further characterized by:

(a) the longitudinal guiding means of the roller means having guiding shoulders, (b) the rail means having guiding surfaces complementary to the guiding shoulders of the roller means to cooperate therewith to maintain longitudinal movement of the crushing belts.

15. A crushing apparatus as claimed in claim 1 further characterized by:

(a) serrations provided on the working surfaces of the slots on at least the lower crushing belt to augment gripping of material to be crushed for feeding through the crusher.

16. A crushing apparatus having: oppositely disposed first and second endless loops of crushing belts carried on respective support means and disposed so that an inner run of the first belt is spaced closely to an adjacent inner run of the second belt to define a throat therebetween, wherein each belt has a slat bed having a plurality of closely spaced slats connected together and extending transversely thereacross to provide an essentially continuous working surface when the slats are coplanar, the apparatus also including means to power at least one belt and converging intake means communicating with the throat to admit a forward end of material to be crushed between the belts, the apparatus being further characterized by:

(a) roller means journalled on the slats, (b) rail means carried on the respective support means and extending adjacent and along the two opposed inner runs of the belts that define the throat, the rail means cooperating with the roller means to support against crushing forces the runs of the belts adjacent to and defining the throat, (c) at least one crushing belt having splitter means thereon, (d) means cooperating with the splitter means to prevent interference with the remaining crushing belt in the throat.

* * * * *